March 3, 1953  E. W. WHITTIER  2,630,559
ELECTRICAL MEASURING APPARATUS
Filed Oct. 29, 1949  2 SHEETS—SHEET 1
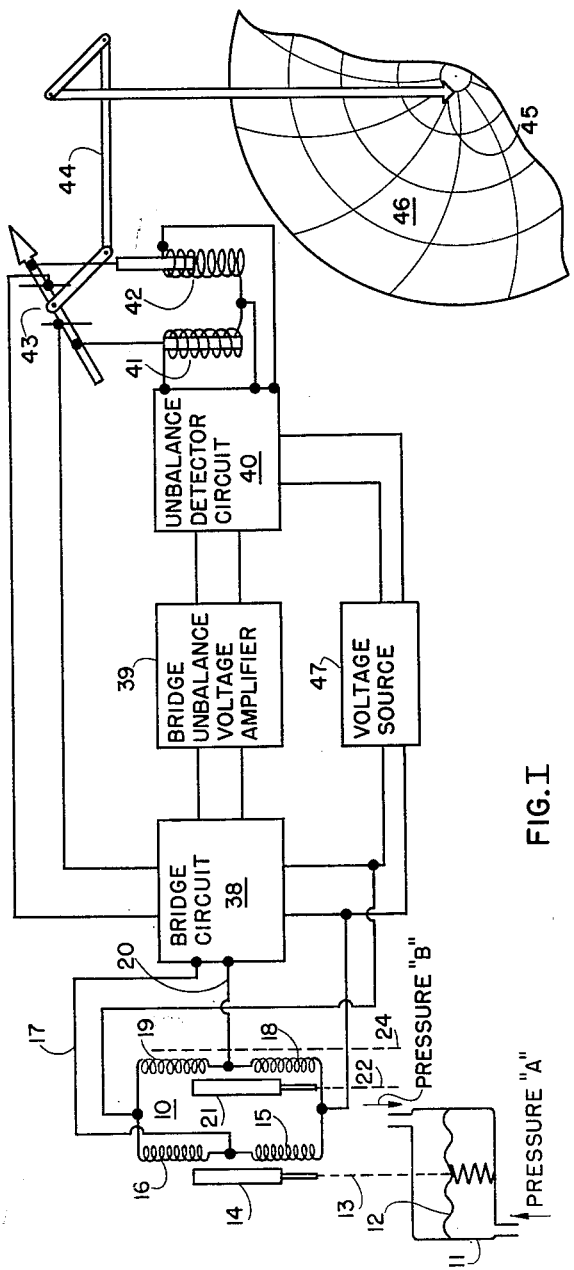
FIG. I
INVENTOR.
ELLERTON W. WHITTIER
BY
Curtis, Morris & Safford

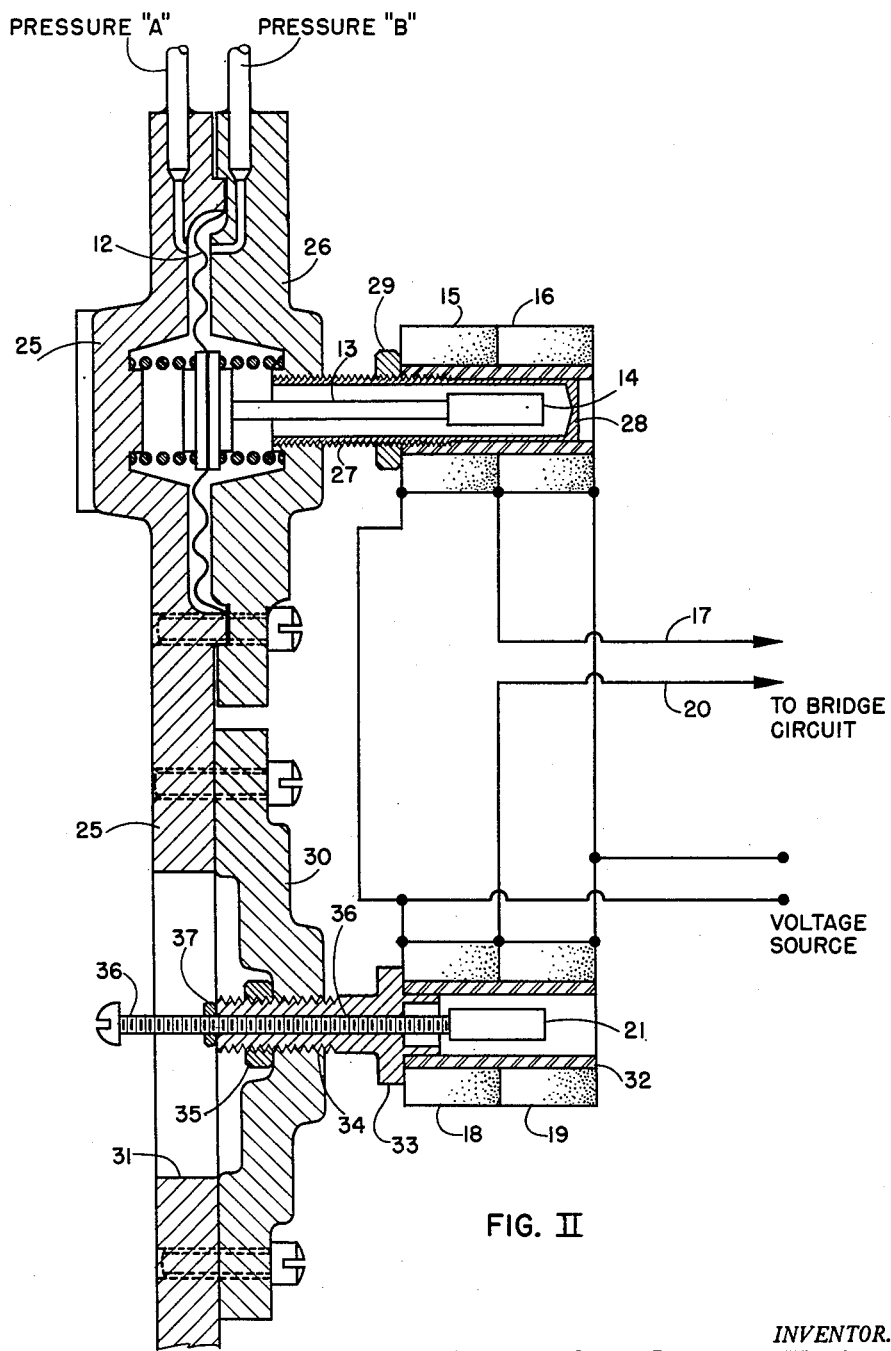
FIG. II
INVENTOR.
ELLERTON W. WHITTIER

Patented Mar. 3, 1953

2,630,559

UNITED STATES PATENT OFFICE 2,630,559

ELECTRICAL MEASURING APPARATUS

Ellerton W. Whittier, Needham, Mass., assignor to The Foxboro Company, Foxboro, Mass.

Application October 29, 1949, Serial No. 124,267

1 Claim. (Cl. 323—75)

This invention relates to instruments which are operative in response to changed or changing values of variable conditions.

In such instruments, various types of electrical circuits are used for various purposes. This invention is particularly concerned with a circuit arrangement for use in the "measuring" section of the instrument.

The intended meaning of the term "measuring" section will be apparent in more detail later in the description herein. For immediate purposes it may be said that the measuring section is that electrical circuit or circuit section which is the first to receive and react to a signal caused by a change in the variable condition.

The circuit arrangement with which this invention is concerned relates to circuit adjustments for electrical zeroing and phase balancing of the circuit, as will be explained later herein.

Therefore, it is an object of this invention to provide new and improved circuit adjustment arrangements for the measuring section of instruments as described above.

As an illustrative embodiment of the invention, the instrument circuit shown and described herein is of the type utilizing an electrical bridge circuit. The output of the measuring circuit of this invention in this instance is applied to the bridge circuit in the conventional manner to upset the electrical balance of the bridge in relation to the condition value change.

In the drawings:

Figure I is a schematic illustration of an instrument embodying this invention; and Figure II is a sectional illustration of the adjustment structure of the instrument of Figure I.

Referring to the instrument shown as Figure I, the extreme left portion of the drawing is the circuit "measuring section" previously referred to, and here generally indicated at 10. Below this section there is shown a differential pressure unit 11. Thus the "condition change" to which this instrument is responsive is the differential of pressures A and B translated into movement of the diaphragm 12. The movement of the diaphragm is transmitted through a mechanical connection thereto indicated at 13. The other end of this mechanical connection is applied to a magnetic core member 14 resulting in movement of the core in response and relation to the movement of the diaphragm.

The circuit section 10 has a portion, shown at the left thereof in association with the core 14 in the form of a pair of coil windings 15 and 16. When an alternating electric current is applied to these windings, from a source to be indicated later herein, an alternating magnetic field is set up about the coils and encompassing the magnetic core 14. It is apparent that the inductance is varied in accordance with the position of the core 14, thus influencing the voltage across coils 15 and 16.

Thus the voltages across the coils will be influenced by and in relation to the differential pressure change in the unit 11 from movement of the diaphragm and hence core 14. The core 14 has an approximate zero position as shown, balancing its influence on the coils 15 and 16.

As illustrated, the coils 15 and 16 are placed one above the other and electrically connected, with their magnetic fields aiding, as may be seen from the central common output lead 17 which is connected both to the top of coil 15 and the bottom of coil 16. As the core 14 is moved more into association with coil 16 the inductance of that coil is increased, with consequent increase of voltage across it. Conversely the inductance and hence the voltage across coil 15 is reduced. Accordingly, a change in the location of the core 14 not only causes a voltage unbalance which is related to the differential pressure change but an indication of which direction the core is moving, through the increase or decrease of voltage across the different coils since a balancing bridge system is used.

Now referring to the right hand portion of the circuit section 10, a pair of coils 18 and 19 are provided, in duplication of the coils 15 and 16 so that the four coils together form what may be called an impedance bridge. Coils 17 and 18 may be located at a point remote from coils 15 and 16 if desired.

In central connection between the coils 18 and 19 there is an output lead 20 comparable to the lead 17 from the coils 15 and 16. These leads comprise the output of the impedance bridge which is the section 10, and this bridge is upset by the movement of the core 14, this upset relation being expressed by a voltage unbalance in the output leads 17 and 20.

In the section 10, the right hand coils 18 and 19 are provided with a magnetic core 21 in association therewith in the same relation as is provided for the coils 15 and 16 with the core 14. There is this difference, that the core 21 is movable by manual adjustment through the mechanical connection 22 rather than the automatic adjustment of the core 14. This manual adjustment of the core 21 is a bridge zero setting means which is used in preparing the instrument for operation to balance for zero voltage between leads 17 and 20. This balance position is influenced by the precise normal location of the core 14.

Another difference between the coils 18 and 19 with respect to the coils 15 and 16 is that the former are manually adjustable together as a unit through the mechanical connection 24, Figure I. This adjustment is with respect to the support of the coils, for the purpose of balancing the phase of the impedance bridge by thus matching the effects on the fields of the coils, 18 and 19 as against the effects on the fields of the coils 15 and 16, of their respective supports. Refer to Figure II for the showing of the mechanical structure of both the zeroing and phase balance manual adjustments. The circuit section 10 of Figure I is shown in Figure II, the upper right of the drawing showing the coils 15 and 16, and the lower right showing the coils 18 and 19. The same impedance bridge connections are shown, with the same magnetic cores 14 and 21 and output leads 17 and 20.

The upper portion of Figure II shows the differential pressure unit, providing the variable positioning of the core 14 within the coils 15 and 16. In this structure, a differential pressure chamber is formed between a backing plate 25 and a cover plate 26. Within this chamber is the diaphragm 12 with the mechanical connection 13 secured thereto so as to transmit the movement of the diaphragm to the core 14. The cover plate side of the differential pressure chamber is extended into the coils 15 and 16 by means of a sleeve 27 having its outer end closed, as at 28, and the coils 15 and 16 are mounted on the sleeve 27 and threaded in place thereon against a shoulder 29. In building a compact unit the proximity of the support cover plate 26 to the coils 15 and 16 brings the magnetic flux close enough to induce circulating or eddy currents in the cover plate. The eddy current magnetic flux couples back into one coil 15, the effects of power dissipation to the cover plate to a greater extent than is coupled back into coil 16. This causes an unbalance of in-phase versus quadrature voltages across coils 15 and 16. Since the coils are fixed with respect to the plate, the effect is also fixed.

The lower portion of Figure II shows the supporting and adjusting arrangement of the core 21 and the coils 18 and 19. A cover plate 30 is mounted on the backing plate 25 over an opening 31 therein. The coils 18 and 19 are mounted on a sleeve 32 against a shoulder 33, and there is a threaded extension from the shoulder at 34, passing through the cover plate 30 and adjustably locked in place therein by a lock nut 35. The coils 18 and 19 are thus adjustable as a unit toward and away from the support cover plate 30. The shoulder 33 and extension 34 are represented in Figure I by the dotted line 24.

In Figure II again, the core 21 is supported by a threaded shaft 36, representing in Figure I the dotted line 22. The shaft 36 passes through the shoulder 33 and extension 34 in threaded engagement therewith and is adjustably locked in place by a lock nut 37.

Thus the core 21 may be adjusted in its relation to the coils 18 and 19 to zero the impedance bridge by balancing against the location of core 14 in relation to the coils 15 and 16. Further, the coils 18 and 19 may be adjusted as a unit with respect to the cover plate 30, to balance the phase relations of the impedance bridge by matching the effect of the cover plate 26 on the field of the coils 15 and 16 with the effect of the cover plate 30 on the coils 18 and 19.

This means that a considerable saving and convenience has been provided, since the various components of the whole structure may be formed to a reasonable tolerance, assembled in a convenient manner, and the electrical balances necessary may be achieved by the adjustments herein provided.

Otherwise it would be necessary to form the components to such a degree of accuracy and to assemble them with such a degree of care, as to make the cost prohibitive.

Referring again to Figure I, the remainder of the circuit and structure is shown merely in illustration of an arrangement that may be used to advantage with the circuit and structure just described in relation to the invention.

The output of the impedance bridge, through the leads 17 and 20 extending to the right in the drawing, is applied to a self balancing bridge circuit shown at 38, as an unbalancing influence therefor. Again to the right, the bridge unbalance voltage is applied to an unbalance detector unit 40.

The output of the unbalance detector 40 is applied to a pair of coils 41 and 42 which operate in solenoid fashion to simultaneously operate a variable condenser 43 and a linkage arrangement 44. The condenser 43 is connected back to the self balancing bridge circuit 38 and operates to rebalance the bridge in the customary manner. The linkage 44 causes a pen 45 to move over a chart 46, recording the variations caused by the operation of the variable condenser 43 as representative of the initial variations in differential pressure as applied, at the left of the drawing, to the diaphragm 12.

Shown below the amplifier 39 is a voltage source 47 which is the direct power source for the impedance bridge, the ordinary bridge 38 and the unbalance detector 40.

This invention therefore provides, in instruments of the type described, a measuring circuit arrangement and structure which may be adjusted for circuit zeroing and phase balancing as a means of providing a precise circuit at a practical cost.

As many possible embodiments may be made of the above invention without departing from the scope thereof, it is to be understood that all matter herein set forth or shown in the accompanying drawings is to be interpreted as illustrative and not in a limiting sense. For example, this invention may be readily adapted to use, as the "measuring" section, an electrical bridge not limited to impedances as components. Suitable arrangements including resistors and/or capacitors may be used as desired.

I claim:

For use in an instrument which is electrically responsive to variable condition changes, a support member, an electrical bridge circuit arrangement including a pair of multiple coil assemblies mounted on said support member, one of said assemblies comprising a multiple coil and a magnetic core movable within said coil to change the magnetic field thereof in response to said variable condition changes, and the other of said assemblies comprising a second multiple coil, mounted for adjustment toward and away from said support member as a means of phase balancing said circuit by balancing the electrical effects between said multiple coil assemblies and said support member, and a second magnetic core, mounted for movement within said second multiple coil to change the magnetic field thereof as a means of zeroing said bridge circuit, said mounting of said second multiple coil comprising a stud secured to said second multiple coil and threaded in said support for adjustment with respect thereto, and a lock nut on said stud for securing said stud in its adjusted position in said support member, and said mounting of said second core comprising a screw secured to said core and threaded through said stud for adjustment with respect thereto, and a lock nut on said screw for securing said screw in its adjusted position in said stud, whereby said second multiple coil may be adjusted with respect to said support without changing said adjustment of said second core with respect to said second multiple coil, and said second core may be adjusted with respect to said second multiple coil without changing said adjustment of said second multiple coil with respect to said support member.

ELLERTON W. WHITTIER.

REFERENCES CITED

The following references are of record in the file of this patent:

UNITED STATES PATENTS

| Number | Name | Date |
|---|---|---|
| 2,154,375 | Chambers | Apr. 11, 1939 |
| 2,317,807 | Ryder | Apr. 27, 1943 |
| 2,348,177 | Keeler | May 2, 1944 |
| 2,359,927 | Melas | Oct. 10, 1944 |